US012589813B2

(12) United States Patent
Nakanishi

(10) Patent No.: US 12,589,813 B2
(45) Date of Patent: Mar. 31, 2026

(54) VEHICLE FRONT BODY STRUCTURE

(71) Applicant: HONDA MOTOR CO., LTD., Tokyo (JP)

(72) Inventor: Yukinobu Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 18/353,156

(22) Filed: Jul. 17, 2023

(65) Prior Publication Data

US 2024/0075989 A1     Mar. 7, 2024

(30) Foreign Application Priority Data

Sep. 2, 2022    (JP) ................................. 2022-140117

(51) Int. Cl.
| | |
|---|---|
| *B62D 21/15* | (2006.01) |
| *B62D 25/02* | (2006.01) |
| *B62D 25/04* | (2006.01) |
| *B62D 25/16* | (2006.01) |
| *E05D 3/02* | (2006.01) |

(52) U.S. Cl.
CPC ......... *B62D 25/163* (2013.01); *B62D 25/025* (2013.01); *B62D 25/04* (2013.01); *E05D 3/02* (2013.01); *E05Y 2900/531* (2013.01)

(58) Field of Classification Search
CPC .... B62D 25/163; B62D 25/025; B62D 25/04; E05D 3/02; E05Y 2900/531
See application file for complete search history.

(56) References Cited

U.S. PATENT DOCUMENTS

| | | | | |
|---|---|---|---|---|
| 9,132,861 | B2 * | 9/2015 | Chung | ............... B62D 25/2036 |
| 9,487,236 | B2 * | 11/2016 | Ozawa | ................. B62D 21/152 |
| 9,688,311 | B2 * | 6/2017 | Yamamoto | ........... B62D 25/025 |
| 10,549,785 | B2 * | 2/2020 | Lee | ......................... B62D 25/04 |
| 11,572,104 | B2 * | 2/2023 | Shimizu | ................. B62D 27/02 |
| 2010/0026051 | A1 * | 2/2010 | Tamakoshi | ........... B62D 25/082 |
| | | | | 296/203.02 |
| 2016/0016612 | A1 | 1/2016 | Torikawa et al. | |
| 2021/0163071 | A1 * | 6/2021 | Sawatzki | ............... B62D 25/04 |

FOREIGN PATENT DOCUMENTS

JP           6185437 B2      8/2017

* cited by examiner

*Primary Examiner* — Taras P Bemko
(74) *Attorney, Agent, or Firm* — Rankin, Hill & Clark LLP

(57) ABSTRACT

A vehicle front body structure includes: a vehicle body frame member arranged behind a front tire of a vehicle; and an extending member located in front of the vehicle body frame member so as to face the front tire and arranged at a height overlapping in a vehicle up-down direction with the front tire, wherein the extending member extends outward in a vehicle width direction beyond a front pillar and a side sill. The front pillar and side sill constitute the vehicle body frame member.

10 Claims, 7 Drawing Sheets

VEHICLE FRONT BODY STRUCTURE

CROSS-REFERENCE TO RELATED APPLICATION

This application claims the benefit of priority to Japanese Patent Application No. 2022-140117 filed on Sep. 2, 2022, the disclosures of all of which are hereby incorporated by reference in their entireties.

TECHNICAL FIELD

The present invention relates to a vehicle front body structure of a vehicle such as an automobile.

BACKGROUND OF THE INVENTION

Japanese Patent No. 618543762 (hereinbelow referred to as Patent Document 1), for instance, discloses a vehicle front part structure provided with a gusset member in a vehicle body at a lower portion of a front pillar arranged behind a front tire of a vehicle. The gusset member has a hollow cross-section and a stepped portion extending in a vehicle up-down direction.

Patent Document 1 claims that a rear portion of the front tire being displaced inward in a vehicle width direction, when an offset load has been inputted, is caught by the stepped portion of the gusset member, to avoid the front tire from contacting a thin plate member such as a dash panel.

SUMMARY

Problems to be Solved

However, the vehicle front part structure disclosed in Patent Document 1 permits the front tire being displaced rearward to collide with, and input an excessive load to, a vehicle body frame member such as the front pillar and a side sill (aka a locker). As a result, the vehicle front part structure disclosed in Patent Document 1 may face a risk of an increasing amount of the vehicle body frame member being deformed when an offset load has been inputted.

Efforts have been actively made in recent years to provide access to sustainable transportation systems friendly to vulnerable transportation participants, such as the elderly, handicapped people, and children. To this end, efforts in research and development have been focused on further improving safety and convenience in transportation through developments related to improving collision safety performance of a vehicle body. As for collision safety performance, an increasing amount of the vehicle body frame member being deformed, when an offset load has been inputted, may narrow vehicle interior space.

The present invention has been devised in view of the above-identified problem and is intended to provide a vehicle front body structure to reduce an amount of a vehicle body frame member being deformed when an offset load has been inputted. The present invention is then intended to contribute to fostering sustainable transportation systems.

Solution to Problems

In order to accomplish an objective as described above, the present invention provides a vehicle front body structure including: a vehicle body frame member arranged behind a front tire of a vehicle; and an extending member located in front of the vehicle body frame member so as to face the front tire and arranged at a height overlapping in a vehicle up-down direction with the front tire, wherein the extending member extends outward in a vehicle width direction beyond the vehicle body frame member.

Advantageous Effects of the Invention

The present invention provides the vehicle front body structure to reduce an amount of the vehicle body frame member being deformed when an offset load has been inputted. Note that the term "offset (crash)" in the present invention includes both of offset frontal crash (at a 40% lap or at an offset of 40%) and small overlap frontal crash (at a 25% lap or at an offset of 25%).

DETAILED DESCRIPTION

Figure 1:
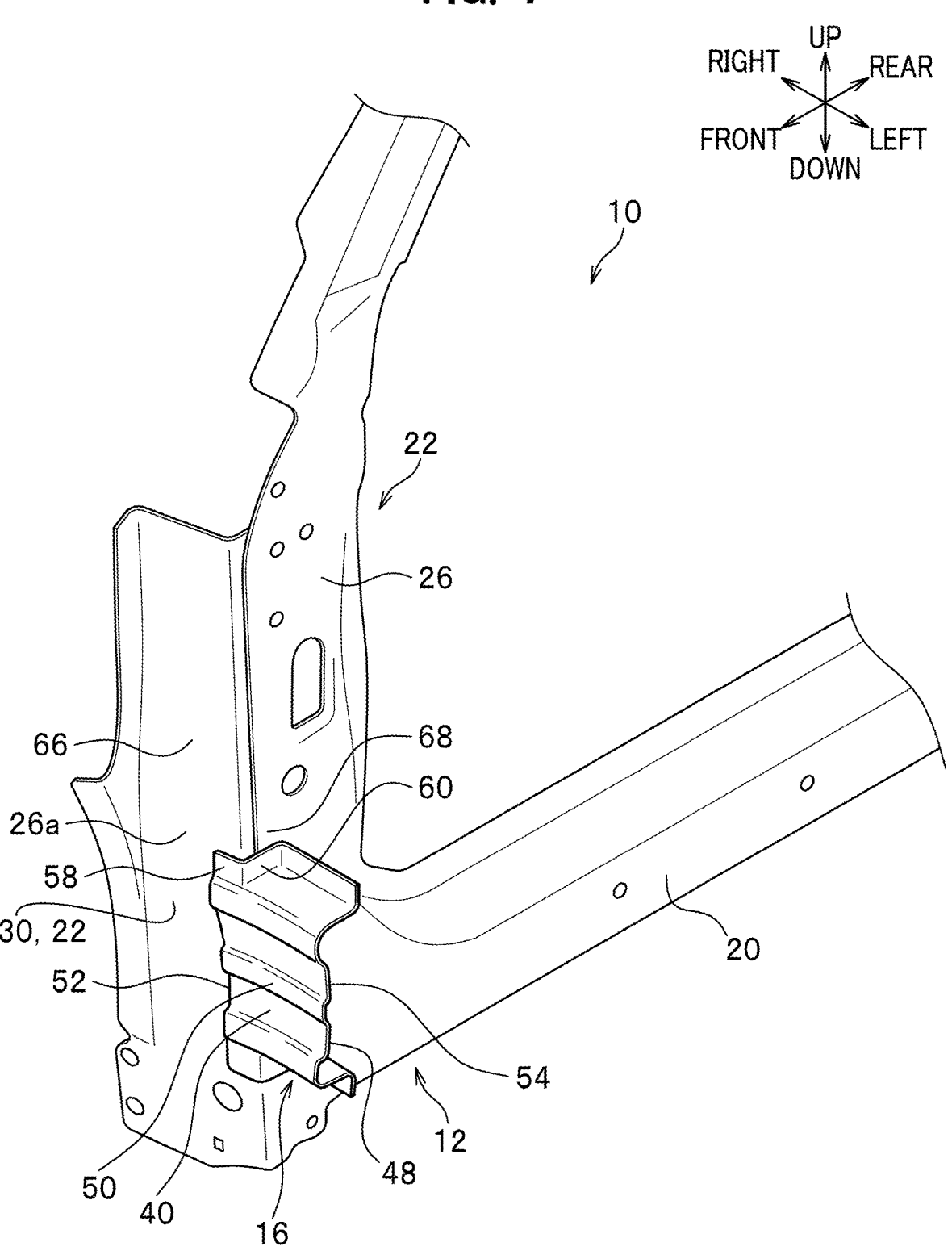
FIG. 1 is a schematic perspective view of vehicle front body provided with a vehicle front body structure according to an embodiment of the present invention.

Next, a description is given in detail of an embodiment of the present invention, with reference to the drawings as required. Note that a term "front-rear" in the drawings indicates a vehicle front-rear direction, a term "right-left" indicates a vehicle width direction (right-left direction), and a term "up-down" indicates a vehicle up-down direction (vertical direction).

As shown in FIG. 1, a vehicle front body 10 provided with a vehicle front body structure according to the embodiment of the present invention includes a vehicle body frame member 12, an outer side panel (front fender) 14 (see FIG. 2), and an extending member 16.

The vehicle body frame member 12 is arranged behind a front tire 18 (see FIG. 2) and includes a side sill 20 and a front pillar 22.

The side sill 20 is arranged on either side in the vehicle width direction at a lower portion of a vehicle body and extends in the vehicle front-rear direction. The front pillar 22 is arranged between a front glass, not shown, and an opening for a front door 24 (see FIG. 2), and extends upward from a front end of the side sill 20, with a top end thereof attached to a roof, not shown. The front pillar 22 includes an outer pillar 26 arranged on an outer side in the vehicle width direction, an inner pillar (not shown) arranged on an inner side in the vehicle width direction, and a pillar stiffener 30 arranged between the outer pillar 26 and inner pillar and working as a reinforcement member (see FIG. 1). Note that a front end portion of the outer panel of the side sill 20 and a lower end portion of the outer pillar 26 of the front pillar 22 are formed as a single piece in the embodiment, as shown in FIG. 1, but are not limited thereto.

Figure 4:
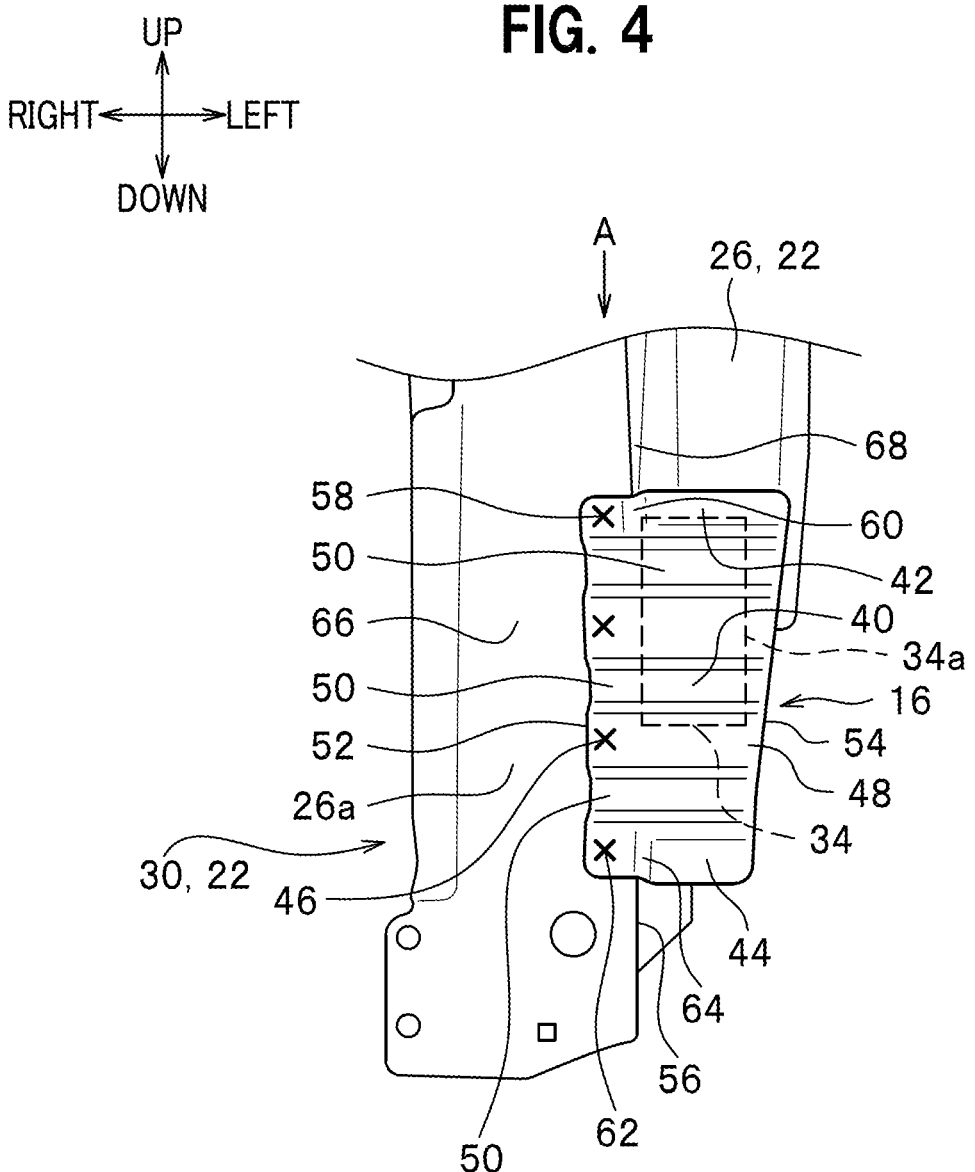
FIG. 4 is a front view of the vehicle front body in FIG. 1, as viewed from front.

The inner pillar and the pillar stiffener 30 each have a hat shape in vertical cross section, and face each other to define a hollow cross section. The pillar stiffener 30 is located in front of the vehicle body frame member 12 so as to face the front tire 18 (see FIG. 2). Additionally, the pillar stiffener 30 is arranged on an inner side in the vehicle width direction than the extending member 16, as shown in FIG. 4.

Figure 3:
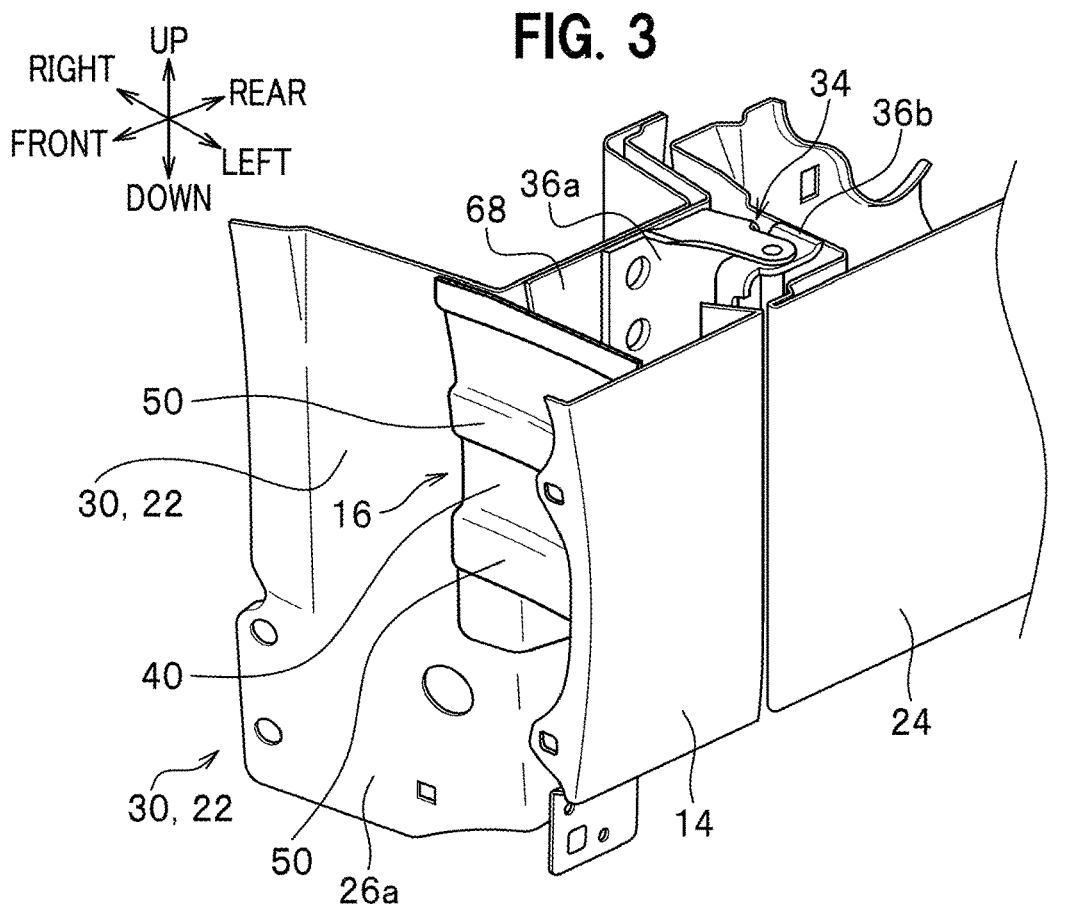
FIG. 3 is a partially-broken enlarged perspective view, taken along a line III-Ill in FIG. 2.

As shown in FIG. 3, a side wall 68 of the outer pillar 26 of the front pillar 22 is provided with a door hinge 34 on which the front door 24 is pivotally attached. The door hinge 34 includes an inner support member 36a attached to the front pillar 22 and pivotally supporting the front door 24, and an outer support member 36b attached to, and supported by, the front door 24 so as to be pivotable with respect to the inner support member 36a.

Figure 2:
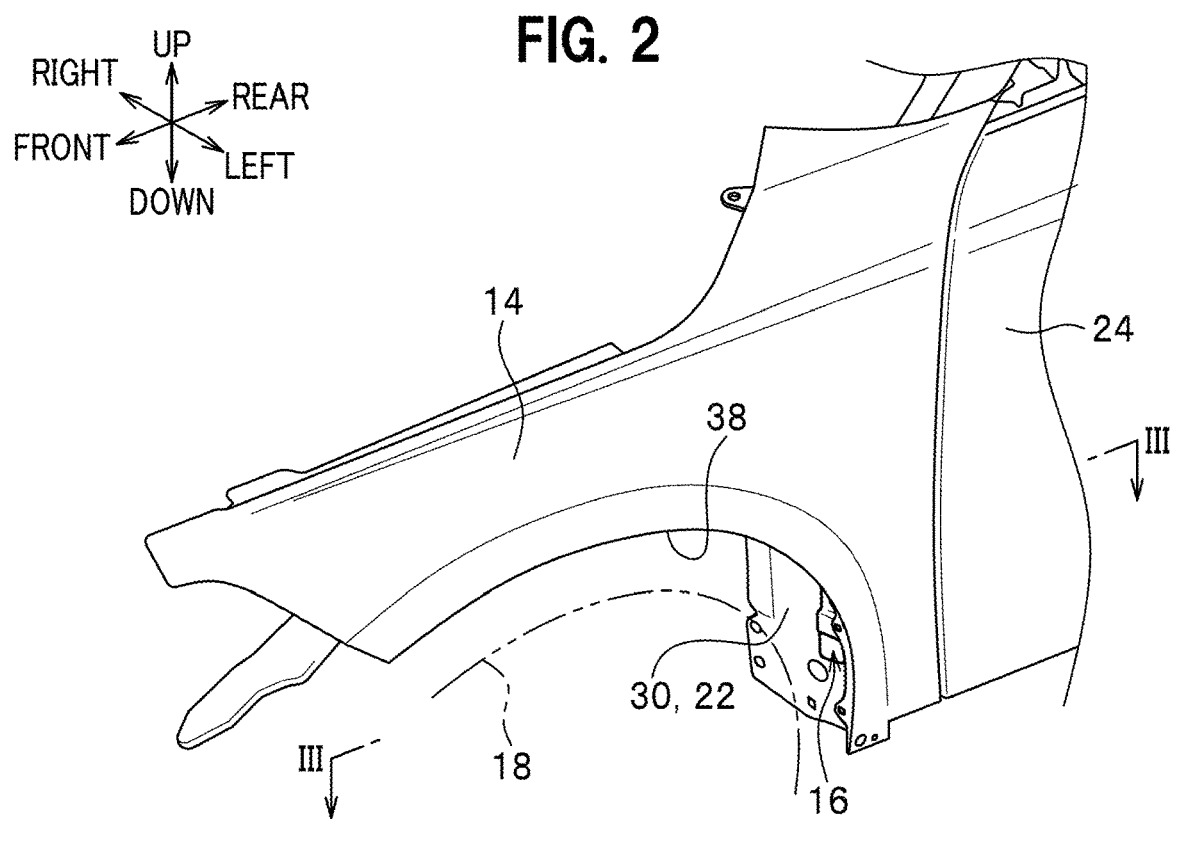
FIG. 2 is a partially-broken perspective view of the vehicle front body in FIG. 1, with an outer side panel and a front door attached thereto.

As shown in FIG. 2, the outer side panel 14 is composed of a front fender, has an opening 38 in a circular arc shape to partly surround an upper portion of the front tire 18, and a rear end thereof extends to a front end of the front door 24, as laterally viewed from outside in the vehicle width direction. The outer side panel 14 is arranged on an outside in the vehicle width direction of the front pillar 22, as viewed from front (see FIG. 7).

Figure 5:
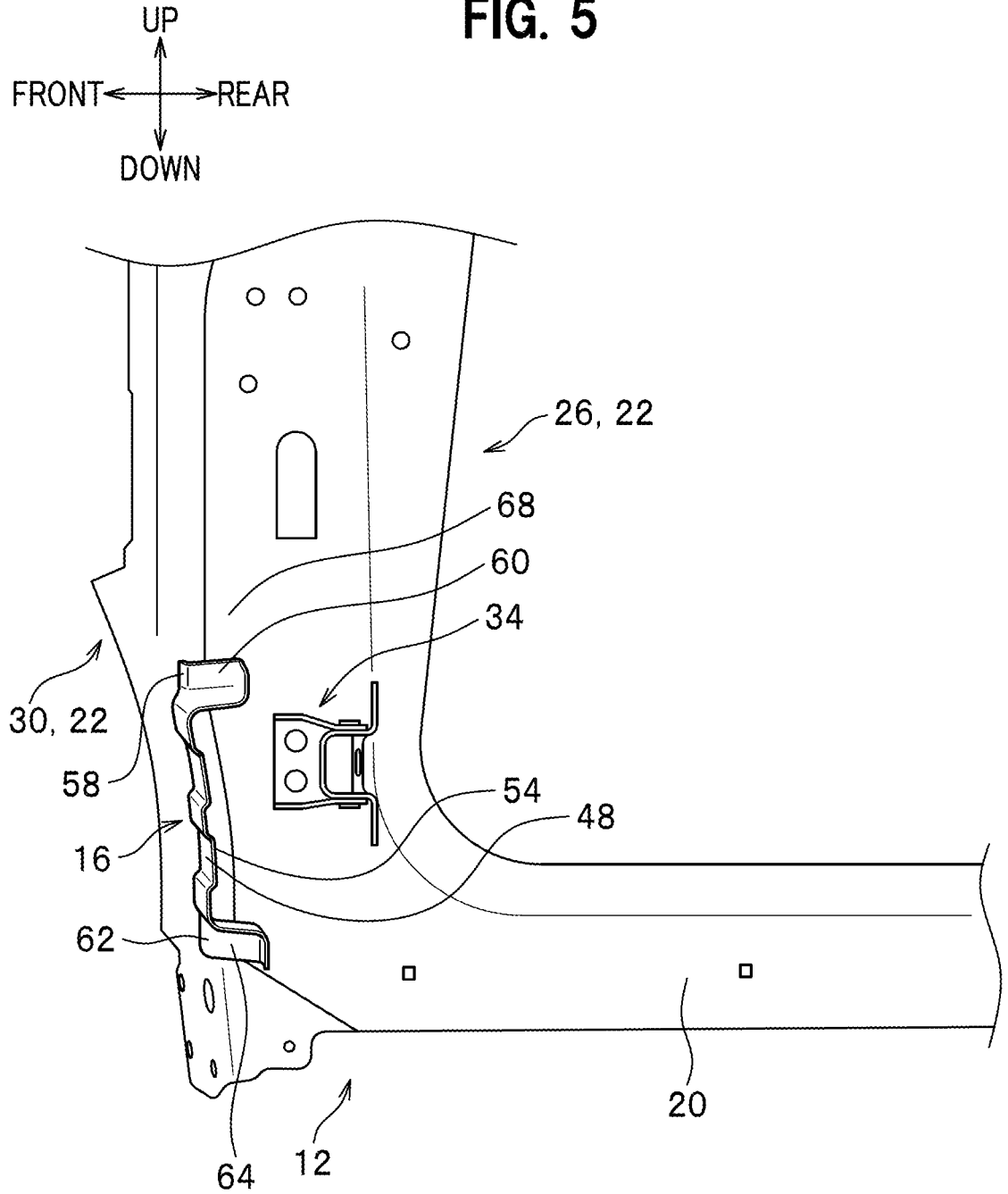
FIG. 5 is a side view of the vehicle front body in FIG. 1, as viewed from outside in a vehicle width direction.

The extending member 16 is located in front of the vehicle body frame member 12 so as to face the front tire 18 and arranged at a height overlapping in the vehicle up-down direction with the front tire 18 (see FIGS. 5 and 2). In addition, the extending member 16 extends outward in the vehicle width direction beyond the front pillar 22 (outer pillar 26) and side sill 20, which compose the vehicle body frame member 12 (see FIG. 4). Further, the extending member 16 is arranged in front of the door hinge 34 (see FIG. 5).

The extending member 16 has a substantially U-shape (see FIG. 5), as laterally viewed from outside in the vehicle width direction, and has a front portion 40 to face the front tire 18, an upper end portion 42 extending upward from an upper end of the front portion 40, and a lower end portion 44 extending downward from a lower end of the front portion 40, as shown in FIG. 4. The front portion 40 has a joined portion 46 to be joined to the front pillar 22 (pillar stiffener 30), and an extending portion 48 extending outward in the vehicle width direction beyond the front pillar 22 (pillar stiffener 30). The extending portion 48 is formed to have a cross section in a U-shape open on the rear side thereof, as viewed laterally from outside in the vehicle width direction (see FIG. 5).

The front portion 40 is provided with ridges (beads) 50 extending in the vehicle width direction. The adjacent ridges 50 extend substantially parallel to each other. Additionally, the front portion 40 has an inner edge 52 located at an inner edge in the vehicle width direction and extending in the up-down direction, and an outer edge 54 located at an outer end in the vehicle width direction and extending in the up-down direction (see FIG. 4), as viewed from front.

The inner edge 52 is located inner in the vehicle width direction than a front ridge 56 of the pillar stiffener 30 and extends substantially parallel to the front ridge 56. The outer edge 54 is located outer in the vehicle width direction than the front ridge 56 of the pillar stiffener 30 and extends from a top end thereof downward as if to intersect with the front ridge 56 of the pillar stiffener 30. That is, a width in the vehicle width direction between the inner edge 52 and outer edge 54 is the longest at the top end, and decreases as the outer edge 54 extends from the upper end portion 42 to the lower end portion 44.

Figure 8:
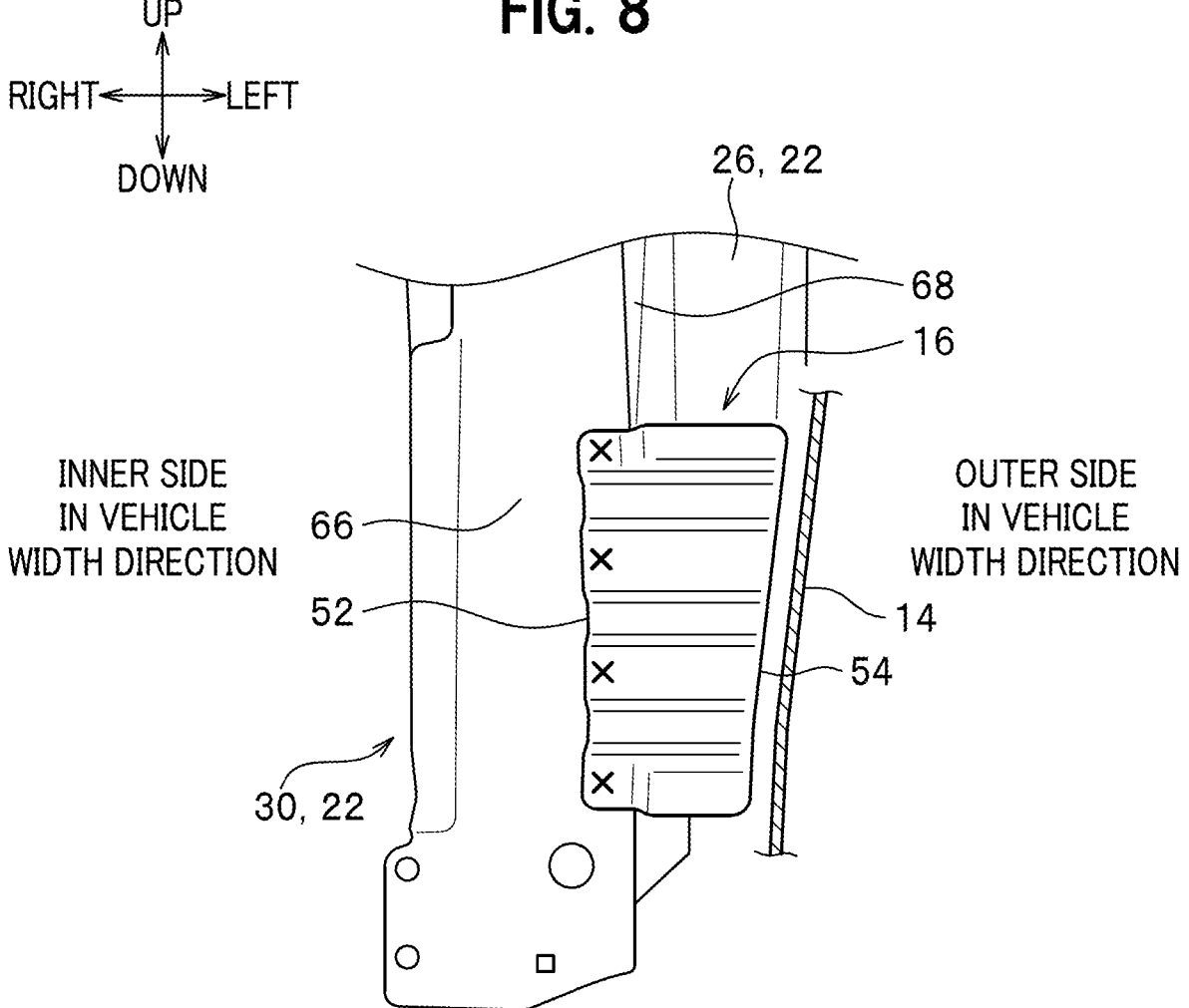
FIG. 8 is a partially-broken front view of an outer edge of an extending member and the outer side panel.

The extending member 16 has the outer edge 54, as a free end, at an outer end in the vehicle width direction thereof. The outer edge 54 is positioned between a laterally outer end 34a of the door hinge 34 and the outer side panel 14. Additionally, the outer edge 54 is formed along (so as to follow) a profile of the outer side panel 14, as shown in FIG. 8.

The upper end portion 42 of the extending member 16 has an upper front-surface bend 58 attached (joined) to a front surface 26a of the pillar stiffener 30, and an upper outer-surface bend 60 bent rearward from the upper front-surface bend 58 and attached (joined) to the outer pillar 26. The lower end portion 44 of the extending member 16 has a lower front-surface bend 62 attached (joined) to the front surface 26a of the pillar stiffener 30, and a lower outer-surface bend 64 bent rearward from the lower front-surface bend 62 and attached (joined) to the outer pillar 26.

The front pillar 22 is formed such that the pillar stiffener 30 has a front wall 66 to face the front tire 18 in the vehicle front-rear direction, and the outer pillar 26 has a side wall 68 to face outward in the vehicle width direction. In other words, the extending member 16 has the upper front-surface bend 58 joined to the front wall 66 of the pillar stiffener 30 and the upper outer-surface bend 60 joined to the side wall 68 of the outer pillar 26, such as by spot welding. Likewise, the extending member 16 has the lower front-surface bend 62 joined to the front wall 66 of the pillar stiffener 30 and the lower outer-surface bend 64 joined to the side wall 68 of the outer pillar 26, such as by spot welding.

This causes each of the upper end 42 and lower end 44 of the extending member 16 to be joined to two planes, consisting of a plane extending in the vehicle width direction (front wall 66) and a plane extending in the vehicle front-rear direction (side wall 68), which are substantially orthogonal to each other. As a result, the extending member 16 is at least partly attached to the front pillar 22 (see FIG. 1).

Figure 7:
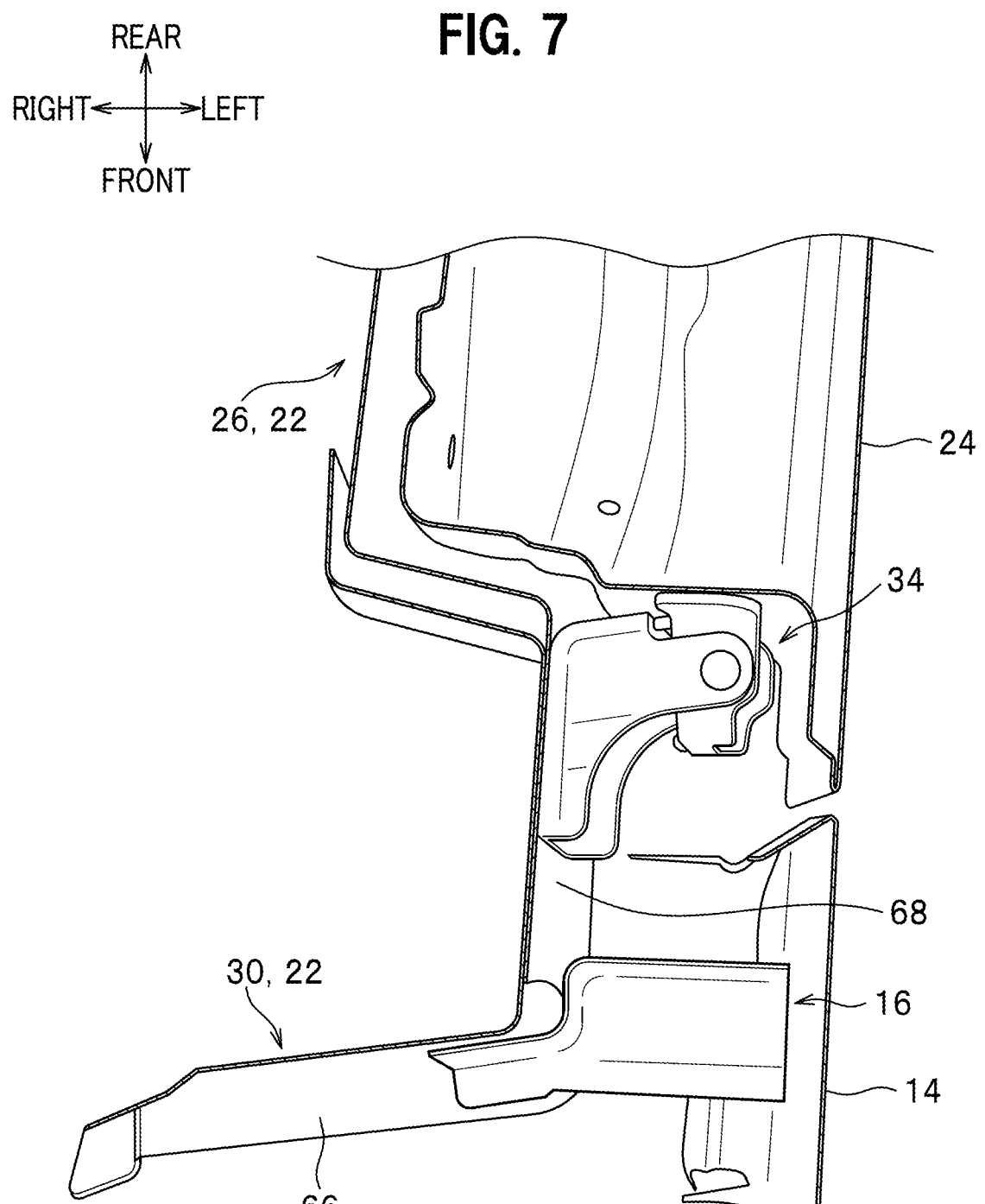
FIG. 7 shows a diagram of the front vehicle body in FIG. 6, with the outer side panel and front door added.

In addition, the extending member 16 is provided at a position overlapping in the vehicle front-rear direction with the door hinge 34 (see FIG. 7).

The vehicle front body 10 provided with the vehicle front body structure according to the embodiment is basically configured as described above, and advantageous effects of the structure is described next.

The embodiment includes the vehicle body frame member 12 (such as the side sill 20 and the front pillar 22) arranged behind the front tire 18, and the extending member 16 located in front of the vehicle body frame member 12 so as to face the front tire 18 and arranged at a height overlapping in the vehicle up-down direction with the front tire 18. The extending member 16 extends outward in the vehicle width direction beyond the vehicle body frame member 12.

In the embodiment, having the extending member 16, extending outward in the vehicle width direction, provided in front of the vehicle body frame member 12 arranged behind the front tire 18 allows the extending member 16 to guide the front tire 18 outward in the vehicle width direction, in a case where the front tire 18 contacts the extending member 16 when an offset load has been inputted. Accordingly, the embodiment reduces a load inputted to the vehicle body frame member 12 when an offset load has been inputted. As a result, the embodiment reduces an amount of the vehicle body frame member 12 being deformed when an offset load has been inputted The embodiment has the door hinge 34, on which the front door 24 is pivotally installed, provided on the side wall 68 on the outer side in the vehicle width direction of the front pillar 22. The extending member 16 is arranged in front of the door hinge 34.

In the embodiment, having the extending member 16 arranged in front of the door hinge 34 allows the extending member 16 to work as an interfering member, when an offset load has been inputted. This prevents, when an offset load has been inputted, the front tire 18, while being displaced rearward, from contacting the door hinge 34, to smoothly guide the front tire 18 outward in the vehicle width direction. As a result, the embodiment allows for controlling an offset load inputted to the vehicle body frame member 12, to reduce an impact on the frame member and an amount of the frame member being deformed when an offset load has been inputted.

The embodiment has the outer side panel 14 (front fender) arranged on an outer side in the vehicle width direction of the front pillar 22. The extending member 16 extends in the vehicle width direction between the front pillar 22 (pillar stiffener 30) and the outer side panel 14.

In the embodiment, the extending member 16 extending in the vehicle width direction between the front pillar 22 (pillar stiffener 30) and the outer side panel 14 allows the front tire 18 to contact the extending member 16 and to be guided outward in the vehicle width direction by the extending member 16, when an offset load has been inputted. As a result, the embodiment allows for controlling an offset load inputted to the vehicle body frame member 12, to reduce an impact on the frame member and an amount of the frame member being deformed when an offset load has been inputted.

The embodiment has the extending member 16 provided at the position overlapping in the vehicle front-rear direction with the door hinge 34.

In the embodiment, the extending member 16 (fully) overlapping in the vehicle front-rear direction with the door hinge 34 causes the front tire 18 to surely contact the extending member 16 and be smoothly guided outward in the vehicle width direction by the extending member 16, when an offset load has been inputted. As a result, the embodiment controls an offset load inputted to the vehicle body frame member 12, to reduce an impact on the frame member and an amount of the frame member being deformed when an offset load has been inputted.

The front pillar 22 is formed such that the pillar stiffener 30 has the front wall 66 to face the front tire 18 in the vehicle front-rear direction, and the outer pillar 26 has the side wall 68 to face outward in the vehicle width direction. The extending member 16 has the upper front-surface bend 58 joined to the front wall 66 of the pillar stiffener 30 and the upper outer-surface bend 60 joined to the side wall 68 of the outer pillar 26, such as by spot welding. Likewise, the extending member 16 has the lower front-surface bend 62 joined to the front wall 66 of the pillar stiffener 30 and the lower outer-surface bend 64 joined to the side wall 68 of the outer pillar 26, such as by spot welding In the embodiment, having the extending member 16 joined to the front wall 66 of the pillar stiffener 30 and joined to the side wall 68 of the outer pillar 26 allows for improving joint strength between the extending member 16 and the front pillar 22, to guide the front tire 18 outward in the vehicle width direction more reliably.

Figure 6:
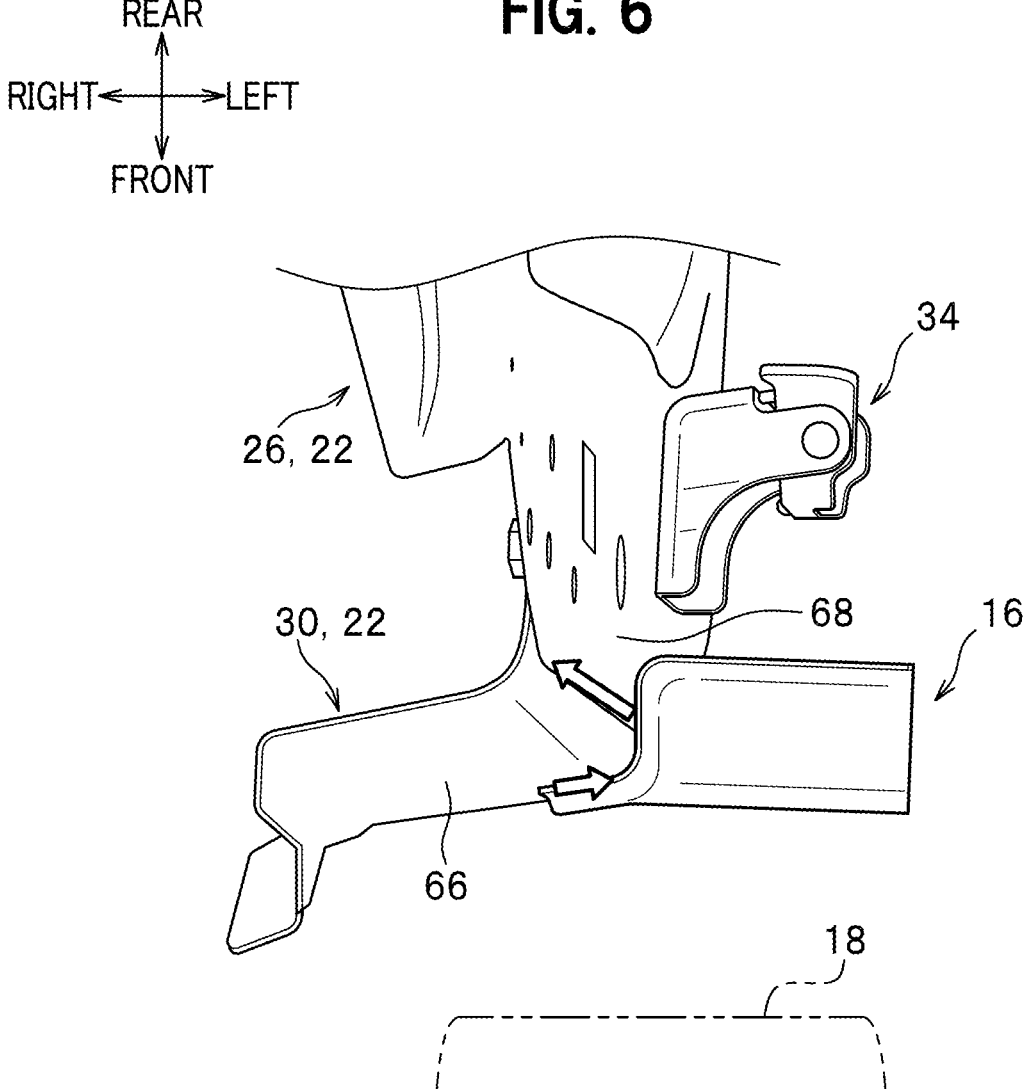
FIG. 6 shows a diagram of the front vehicle body, as viewed from an arrowed direction A in FIG. 4.

More specifically, in a process of guiding the front tire 18, the extending member 16 has a joint with the front wall 66 of the pillar stiffener 30 supported in a shearing direction and a joint with the side wall 68 of the outer pillar 26 supported in a direction of being pressed, while the front tire 18 is being guided outward in the vehicle width direction of the extending member 16 (see open arrows in FIG. 6). As a result, the embodiment has the extending member 16 joined to two planes, consisting of the plane extending in the vehicle width direction (front wall 66) and the plane extending in the vehicle front-rear direction (side wall 68), which are substantially orthogonal to each other, to suitably prevent the extending member 16 from coming off, and being separated from, the front pillar 22.

The embodiment has the front portion 40 of the extending member 16 provided with the ridges (beads) 50 extending in the vehicle width direction.

In the embodiment, having the ridges 50 prevents the extending member 16 from being deformed inward in the vehicle width direction, even if the front tire 18 contacts an outer portion in the vehicle width direction of the extending member 16 when an offset load has been inputted. As a result, the embodiment allows for guiding the front tire 18 outward in the vehicle width direction more reliably.

The embodiment has the front portion 40 of the extending member 16, having the joined portion 46 to be joined to the front pillar 22 (pillar stiffener 30) and the extending portion 48 extending outward in the vehicle width direction beyond the front pillar 22 (pillar stiffener 30). The extending portion 48 is formed to have a cross section in a U-shape open on the rear side thereof, as viewed laterally from outside in the vehicle width direction.

In the embodiment, having the extending portion 48 formed to have a cross section in a U-shape open on the rear side thereof, as viewed laterally from outside in the vehicle width direction, prevents the extending member 16 from being deformed inward in the vehicle width direction, even if the front tire 18 contacts an outer portion in the vehicle width direction of the extending member 16 when an offset load has been inputted. As a result, the embodiment guides the front tire 18 outward in the vehicle width direction further reliably.

The embodiment has the outer edge 54, at an outer end in the vehicle width direction of the extending member 16, positioned between the laterally outer end 34a of the door hinge 34 and the outer side panel 14.

In the embodiment, having the outer edge 54 of the extending member 16 positioned between the outer side panel 14 and the laterally outer end 34a of the door hinge 34 allows for increasing a dimension in the vehicle width direction of the extending member 16. As a result, the embodiment allows for increasing a length of a path in which the front tire 18 contacts the extending member 16 and is guided outward in the vehicle width direction.

The embodiment has the outer edge 54 of the extending member 16 formed along (so as to follow) the profile of the outer side panel 14.

In the embodiment, the outer edge 54 of the extending member 16 being formed along the profile of the outer side panel 14 allows for increasing a dimension in the vehicle width direction of the extending member 16. As a result, the embodiment allows for increasing a length of a path in which the front tire 18 contacts the extending member 16 and is guided outward in the vehicle width direction.

In the embodiment, the vehicle body frame member 12 being composed of the side sill 20 and the front pillar 22 and the extending member 16 being at least partly attached to the front pillar 22 causes the front tire 18 to reliably contact the extending member 16 and be guided outward in the vehicle width direction by the extending member 16, when an offset load has been inputted. As a result, the embodiment controls an offset load inputted to the vehicle body frame member 12, to reduce an impact on the frame member and an amount of the frame member being deformed when an offset load has been inputted.

LIST OF REFERENCE SIGNS

10: vehicle front body, 12: vehicle body frame member, 14: outer side panel, 16: extending member, 18: front tire, 20: side sill, 22: front pillar, 24: front door, 26: outer pillar, 26*a*: front surface (of outer pillar), 30: pillar stiffener, 34: door hinge, 34*a*: laterally outer end (of door hinge), 40: front portion, 48: extending portion, 50: ridge, 54: outer edge, 66: front wall, and 68: side wall.

What is claimed is:

1. A vehicle front body structure comprising:

a vehicle body frame member arranged behind a front tire of a vehicle; and an extending member located in front of the vehicle body frame member so as to face the front tire and arranged at a height overlapping in a vehicle up-down direction with the front tire, wherein the extending member extends outward in a vehicle width direction beyond the vehicle body frame member, wherein the extending portion is formed to have a cross section in a U-shape open on a rear side thereof, as viewed laterally from outside in the vehicle width direction, and has an upper end portion and a lower end portion relative to the vehicle up-down direction, each of the upper end portion and the lower end portion bent rearwardly in a vehicle front-rear direction.

2. The vehicle front body structure according to claim 1, wherein the vehicle includes a front door, the vehicle body frame member includes a door hinge, on which the front door is pivotally installed, provided on a side wall on an outer side in the vehicle width direction thereof, and the extending member is arranged in front of the door hinge.

3. The vehicle front body structure according to claim 2, wherein the extending member is provided at a position overlapping in the vehicle front-rear direction with the door hinge.

4. The vehicle front body structure according to claim 2, wherein the vehicle body frame member has a front wall to face the front tire in the vehicle front-rear direction, and the side wall, and the extending member is directly joined to the front wall and the side wall.

5. The vehicle front body structure according to claim 1, wherein the vehicle includes an outer side panel arranged on an outer side in the vehicle width direction of the vehicle body frame member, and the extending member extends in the vehicle width direction between the vehicle body frame member and the outer side panel.

6. The vehicle front body structure according to claim 5, wherein the vehicle body frame member includes a door hinge, on which the front door is pivotally installed, provided on a side wall on an outer side in the vehicle width direction thereof, the extending portion has an edge at an outer end in the vehicle width direction thereof, and the edge is positioned between a laterally outer end of the door hinge and the outer side panel.

7. The vehicle front body structure according to claim 5, wherein the extending portion has an edge at an outer end in the vehicle width direction thereof, and the edge is formed along a profile of the outer side panel.

8. The vehicle front body structure according to claim 1, wherein the extending member is provided with ridges extending in the vehicle width direction.

9. The vehicle front body structure according to claim 1, wherein the vehicle body frame member includes:

a side sill extending in a vehicle front-rear direction; and a front pillar extending in the vehicle up-down direction from a front end of the side sill, and the extending member is at least partly attached to the front pillar.

10. A vehicle front body structure comprising:

a vehicle body frame member arranged behind a front tire of a vehicle; and an extending member located in front of the vehicle body frame member so as to face the front tire and arranged at a height overlapping in a vehicle up-down direction with the front tire, wherein the extending member extends outward in a vehicle width direction beyond the vehicle body frame member, wherein the vehicle body frame member includes a side wall on an outer side in the vehicle width direction thereof and a front wall facing the front tire in a vehicle front-rear direction, and the extending member is directly joined to the front wall and the side wall.

* * * * *